(12) United States Patent
Chand et al.

(10) Patent No.: US 8,132,225 B2
(45) Date of Patent: Mar. 6, 2012

(54) SCALABLE AND FLEXIBLE INFORMATION SECURITY FOR INDUSTRIAL AUTOMATION

(75) Inventors: Sujeet Chand, Brookfield, WI (US); David W. Farchmin, Gafton, WI (US); John J. Baier, Mentor, OH (US); Michael D. Kalan, Highland Heights, OH (US); Randall A. Marquardt, Waukesha, WI (US); Richard A. Morse, Hudson, OH (US); Stephen C. Briant, Moon Township, PA (US)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 1166 days.

(21) Appl. No.: 10/955,495

(22) Filed: Sep. 30, 2004

(65) Prior Publication Data

US 2006/0074917 A1     Apr. 6, 2006

(51) Int. Cl.
*G06F 17/00* (2006.01)

(52) U.S. Cl. .............................. 726/1; 707/778; 340/506

(58) Field of Classification Search ......... 726/2; 707/10
See application file for complete search history.

(56) References Cited

U.S. PATENT DOCUMENTS

| | | | |
|---|---|---|---|
| 5,446,903 A | 8/1995 | Abraham et al. | |
| 5,539,906 A | 7/1996 | Abraham et al. | |
| 6,480,109 B1 * | 11/2002 | Tice | 340/506 |
| 6,571,141 B1 | 5/2003 | Brown | |
| 6,697,810 B2 | 2/2004 | Kumar et al. | |
| 6,747,564 B1 * | 6/2004 | Mimura et al. | 340/5.52 |
| 6,975,219 B2 * | 12/2005 | Eryurek et al. | 340/517 |
| 7,227,450 B2 * | 6/2007 | Garvy et al. | 340/286.05 |
| 7,272,815 B1 * | 9/2007 | Eldridge et al. | 717/101 |
| 2002/0196962 A1 * | 12/2002 | Fukuhara et al. | 382/103 |
| 2002/0199123 A1 * | 12/2002 | McIntyre et al. | 713/202 |
| 2003/0061506 A1 * | 3/2003 | Cooper et al. | 713/201 |
| 2003/0076224 A1 * | 4/2003 | Braune | 340/500 |
| 2004/0010709 A1 * | 1/2004 | Baudoin et al. | 713/201 |
| 2004/0015262 A1 | 1/2004 | Brown et al. | |
| 2004/0015619 A1 | 1/2004 | Brown et al. | |
| 2004/0107345 A1 * | 6/2004 | Brandt et al. | 713/171 |
| 2004/0117624 A1 * | 6/2004 | Brandt et al. | 713/166 |
| 2004/0125206 A1 * | 7/2004 | Lohmann | 348/155 |
| 2004/0148513 A1 * | 7/2004 | Scott et al. | 713/200 |
| 2004/0162996 A1 | 8/2004 | Wallace et al. | |

(Continued)

FOREIGN PATENT DOCUMENTS

WO     0182032     11/2001

OTHER PUBLICATIONS

ISA-dS95.01, "Enterprise-Control System Integration; Part 1: Models and Terminology," Nov. 1999, Instrument Society of America.*

(Continued)

*Primary Examiner* — Luu Pham
(74) *Attorney, Agent, or Firm* — Turocy & Watson, LLP; R. Scott Speroff; John M. Miller

(57) ABSTRACT

A security system that relates to industrial automation security comprises a component that receives a request to modify security relating to a zone of a factory floor, the zone being less than an entirety of the factory floor. A zonal security component generates security procedures for the zone, the security procedures differ from security procedures implemented on the factory floor outside the zone.

6 Claims, 14 Drawing Sheets

U.S. PATENT DOCUMENTS

| | | | | |
|---|---|---|---|---|
| 2004/0199351 A1* | 10/2004 | Ott et al. | | 702/108 |
| 2004/0260408 A1* | 12/2004 | Scott et al. | | 700/20 |
| 2005/0007249 A1* | 1/2005 | Eryurek et al. | | 340/511 |
| 2005/0012608 A1* | 1/2005 | Havekost et al. | | 340/517 |
| 2005/0066241 A1* | 3/2005 | Gross et al. | | 714/48 |
| 2005/0080520 A1* | 4/2005 | Kline et al. | | 701/1 |
| 2005/0091338 A1* | 4/2005 | de la Huerga | | 709/217 |
| 2005/0125674 A1* | 6/2005 | Nishiki et al. | | 713/182 |
| 2005/0159932 A1* | 7/2005 | Thurner | | 703/2 |
| 2005/0200471 A1* | 9/2005 | Garvy et al. | | 340/506 |

OTHER PUBLICATIONS

Bruce D'Ambrosio, "Security Situation Assessment and Response Evaluation (SSARE)" 2001, IEEE, pp. 387-394.*

Boutaba et al., "Extending COPS-PR with IP networks" Journal of Network and Systems Management Documents Considered to Be Relevant Plenum USA, vol. 10, No. 1, Mar. 2002, pp. 91-106.

European Search Report dated Nov. 17, 2006 for European Patent Application Serial No. 02021342.0-2413, 3 Pages.

European Search Report dated Feb. 28, 2006, for European Patent Application Serial No. EP05021342, 3 pages.

Raouf Boutaba, et al. Extending COPS-PR with Meta-Policies for Scalable Management of IP Networks. Journal of Network and Systems Management, vol. 10, No. 1, pp. 91-106, Mar. 2002.

Australian Search Report dated May 12, 2006 for Patent Application Serial No. SG 200506293-0, 4 pages.

* cited by examiner

SCALABLE AND FLEXIBLE INFORMATION SECURITY FOR INDUSTRIAL AUTOMATION

TECHNICAL FIELD

The subject invention relates generally to industrial system automation, and more particularly to security relating to factory floor devices within the industrial system.

BACKGROUND OF THE INVENTION

Advancements in technology have allowed many factory environments to become partially or completely automated in many circumstances, thus improving output in terms of both quality and efficiency. For example, applications that once required workers to put themselves proximate to heavy machinery and other various hazardous conditions can now be completed at a safe distance from such hazards. Further, imperfections associated with human action have been minimized through employment of highly precise machines. Many of these factory devices supply data related to manufacturing to databases that are accessible by system/process/project managers on a factory floor. For instance, sensors can detect a number of times a particular machine has completed an operation given a set amount of time. Further, sensors can deliver data to a processing unit relating to system alarms. Thus, a factory automation system can review collected data and automatically and/or semi-automatically schedule maintenance of a device, replacement of a device, and other various procedures that relate to automating an industrial operation.

Data collected from industrial controllers can thereafter be utilized by high-level systems relating to the factory. For instance, enterprise resource planning (ERP) systems can utilize data obtained from an industrial controller to assist in overall product schedules, supply chain coordination, and the like. ERP systems are management information systems that integrate and automate many business practices associated with operations or production aspects of a business/company. Typically, ERP systems are cross-functional and exist across an enterprise, thus enabling functional departments involved in operations or production to be integrated into a single system.

ERP systems are associated with substantial security mechanisms, as a significant amount of money and man-hours is typically required for implementing ERP systems, and companies wish to protect this investment. For example, ERP systems utilize firewalls to secure the system from attack from outside sources, and to prevent an internal user from operating an internal machine outside the ERP system environment. Specifically, an internal user cannot manipulate the system to enable a workstation to operate outside such system. Such strict security policies are not optimal for devices on a factory floor. Factory floor security systems are employed primarily to protect against accidental, internal security breaches. For example, it could be disastrous if a user accidentally altered a recipe for a pharmaceutical product. Conventional factory floor security systems utilize global security measures to prevent security breaches. Particularly, if maintenance issues arise or a recipe is changed, conventional security systems require an entire factory floor to be either shut down or continue operation without protection from the security system. Accordingly, these factory floor security systems result in production inefficiency and/or unstable operating environments.

In view of at least the above, there exists a need in the art for an improved security system to be employed with factory floor devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention provides systems and/or methodologies that facilitate implementing zonal security upon a factory floor. For example, it is often desirable on a factory floor to modify security regulations with respect to a single device, process cell, unit, etc. As discussed above, conventional factory floor security systems are inflexible, and require that an entire factory floor or a large portion thereof be subject to security modifications. Thus, for instance, even if only a single sub-process is desirably pulled offline and debugged, an entire factory floor must be pulled offline to facilitate such debugging, thereby compromising performance and throughput as well as security of other devices/processes. The subject invention allows a zone to be defined/determined, wherein security can be variably implemented and modified with respect to that zone while not requiring an entire factory floor to be subject to security modifications. The subject invention thus makes applications on a factory floor more efficient as well as more secure.

In accordance with one aspect of the subject invention, a security system can receive a request to modify current security with respect to a portion of a factory floor (e.g., a particular device, unit, process cell, etc.). Thereafter, a zone that includes the portion of the factory floor can be determined. For instance, zones can be predefined in a factory floor representation, and thus a zone is automatically determined upon selection of a corresponding portion of the factory floor within the factory floor representation. Further, zones can be dynamically determined based upon an awareness of devices and/or operations undertaken on the factory floor. For example, disabling an alarm for one device may necessarily cause an alarm to trigger in a separate device—thus, it would be desirable to disable both alarms. Accordingly, as a component is aware of the factory floor and its configurations, a zone can be dynamically determined based upon a desirably modified device, process cell, area, unit, site, operation, phase, etc.

The zonal security system of the present invention can employ structured data models in connection with generating and implementing zonal security procedures. Particularly, conventional industrial controllers simply monitor status of sensors and actuators, and middleware is required to transform the data into a structured model that can be analyzed by a high-level system (e.g., an ERP system and/or an MES system). The present invention, however, contemplates employing structured data models that can be recognized and created by both factory floor industrial controllers as well as high-level systems. Further, this data model can be utilized in connection with generating a factory floor representation. Accordingly, data can be communicated to and from both an industrial controller and a high-level system directly without requiring utilization of middleware. Moreover, zonal security procedures can be implemented through these structured data models. For example, SP95 and S88 are two standards that can be utilized as structured data models in accordance with the subject invention. Any suitable structured data model, however, can be utilized in connection with the subject invention and are intended to fall under the scope of the hereto-appended claims.

In accordance with another aspect of the present invention, various authentication techniques can be employed to render factory floor devices secure from security breaches. For example, conventional user names and passwords can be utilized to identify an operator and ensure that such operator has authority to implement the requested security modifications. Moreover, contextual data can be analyzed to determine whether security modifications are acceptable. For instance, a particular operator may have authority to modify security only at particular times and/or plant locations. Further, current factory floor actions can be analyzed to determine whether security modifications can be made. In another example, devices can be authenticated prior to implementing modified security procedures related thereto. Particularly, it could be catastrophic if security modifications were delivered to an incorrect device. Accordingly, variable levels of device authentication, such as digital signatures and certificates where keys can range from simple to complex, can be utilized in connection with the subject invention.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
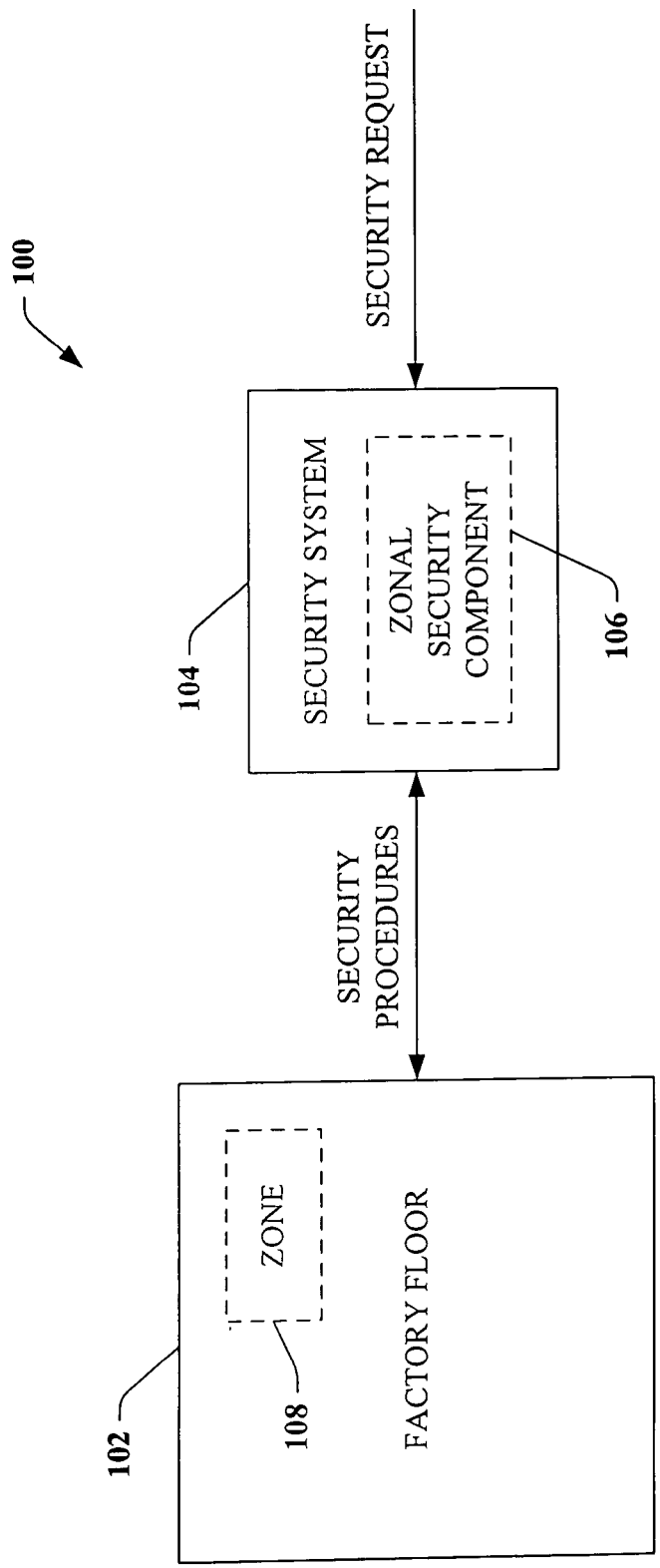
FIG. 1 is a high-level block diagram of a system that facilitates generating and implementing zonal security procedures within a factory floor in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with an aspect of the subject invention. The subject invention relates to a novel system 100 that facilitates implementation of a scalable and flexible security system with respect to factory floor devices. The system 100 includes a factory floor 102 that comprises device(s), wherein such device(s) are utilized to effectuate completion of one or more operations, phases, etc. The factory floor 102 is associated with a security system 104 that receives a security request. For instance, the security request can originate from a user, from a combination of a sensor and a user, from a sensor alone, from software, or any other suitable manner by which a security request can be generated.

The system 100 provides security benefits that are unavailable in conventional security systems that are utilized in connection with an industrial system. Particularly, it is often desirable to perform maintenance, testing, debugging, recommissioning, and the like upon a factory floor device, part, system, process, etc. Conventional security systems are inflexible in that an entirety of the security system would be disabled or modified, even if only a portion of an industrial system is desirably released from the security system or is desirably existent within a modification of the security system.

The system 100 mitigates the aforementioned deficiencies through utilization of a zonal security component 106, which enables a zone 108 to be separate from the factory floor 102 for implementation of security procedures for such zone 108. The zone 108 can be a particular device or set of devices, a process, a part or series of parts, a unit, an operation, an area, or any other suitable partitioning of the factory floor. More particularly, the zone 108 can represent a mixing operation that is utilized in connection with completing a production process for a pharmaceutical. The security system 104 typically renders the mixing operation (e.g., the zone 108) inaccessible and/or unmodifiable to users/operators, due to fear of accidental alteration to the process that could compromise the pharmaceutical being manufactured. Conventionally, to allow an operator access to the mixing operation for debugging purposes, the security system 104 would be disabled with respect to the entirety of the factory floor 102. Such global disabling renders the factory floor 102 subject to internal security breaches resulting from malicious operators or simple mistake. Utilizing the subject invention, the zonal security component 106 can isolate the zone 108 from the factory floor 102, and provide security procedures relating to the zone 108 without altering security with respect to a remainder of the factory floor 102. Thus, maintenance operations and the like can be undertaken with respect to the zone 108 without compromising security of other devices, process cells, areas, sites, etc. on the factory floor 102. The security procedures can be transmitted from the security system 104 to the zone 108 via any suitable data transmission system/method. For instance, the security procedures can be transmitted wirelessly and/or through a wireline connection.

In accordance with one aspect of the present invention, industrial controllers (not shown) resident upon the factory floor 102 can communicate with the security system 104 and the zonal security component 106 to effectuate appropriate actions relating to security of the zone 108. For instance, an industrial controller can be employed to control a certain cell/unit or procedure, which is desirably tested and/or debugged. Particularly, the industrial controller will include at least a portion of control logic that is employed to effectuate the aforementioned procedure and/or cell/unit. A request for debugging such procedure can be delivered to the security system 104, and the zonal security component 106 can locate the industrial controller(s) that are employed to control such cell/area/procedure and devices associated therewith. The zonal security component 106 can then effectively isolate the industrial controller(s) and associated device(s) from the factory floor 102 with respect to security and issue security procedures related solely to the industrial controller(s) and associated device(s). For example, these procedures can include disabling alarms prior to providing an operator with access to control logic, and resetting of safety circuits upon completion of an operation associated with maintenance, debugging, testing, etc.

An industrial controller that is at least a portion of the zone 108 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as an industrial controller, it is to be understood that any suitable industrial control device can be employed in connection with the subject invention. For example, any suitable microprocessor and/or microcontroller can be utilized within the system 100 as an industrial controller.

In accordance with yet another aspect of the present invention, the security system 104 can communicate directly with intelligent devices on the factory floor 102. Conventional industrial automation systems utilize middleware to facilitate communications between high-level industrial automation systems and the factory floor 102. Such high-level industrial automation systems include, but are not limited to, enterprise resource planning (ERP) systems and manufacturing execution systems (MES). Conventional factory floor devices only monitor status of sensors and actuators, thus obtaining and storing data in strings of "1"s and "0"s, while high-level automation systems utilize structured data models. The subject invention, however, contemplates utilizing substantially similar data models in intelligent devices on the factory floor 102 (e.g., industrial controllers) as is employed within high-level automation systems (e.g., systems that are employed to implement the security system 104). Accordingly, the security system 104 (and the zonal security component 106) can communicate directly with devices on the factory floor 102 that are associated with sufficient processing and storage capabilities. Two exemplary standards that can be utilized in connection with data models common to factory floor devices and high-level systems are S88 and SP95. S88 is a standard primarily used for batch processing applications, and SP95 is a standard that provides a mechanism for generating a hierarchical representation of a plant. Between these two standards, data models can be generated that sufficiently represent a plant as well as operations that are undertaken within the plant. While S88 and SP95 are two standards that can be employed in connection with the subject invention, it is understood that any structured data model has been contemplated by the inventors of the subject invention, and all suitable data models are intended to fall under the scope of the hereto-appended claims. The direct communication facilitates efficient determination of zones and efficient implementation of zonal security procedures.

Moreover, the common data model utilized by both intelligent devices on the factory floor and high-level systems allows for automatic integration of distributed security models. For example, a localized security model employed within an original equipment manufacturer (OEM) machine can be integrated with centralized security at an end-user's site. Particularly, policies defined within the common data model can effectuate such automatic integration.

Figure 2:
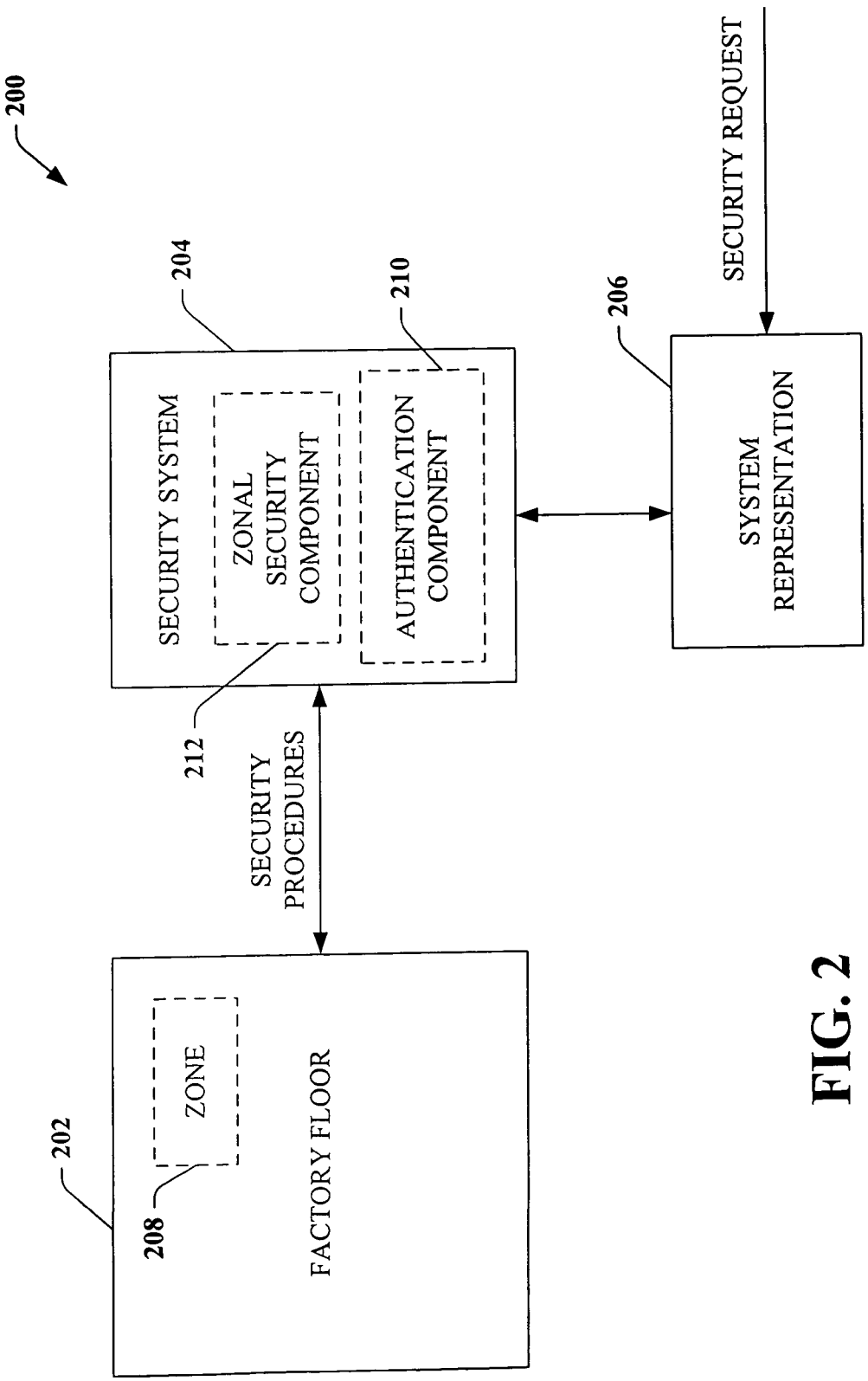
FIG. 2 is a block diagram of a system that facilitates generating and implementing zonal security procedures within a factory floor in accordance with an aspect of the subject invention.

Referring now to FIG. 2, a system 200 that facilitates generation of zonal security procedures and implementation thereof is illustrated. The system 200 includes a factory floor 202 that operates in accordance with a security system 204. The security system 204, for example, can be employed to ensure that safety switches are properly set, that alarms are enabled, and other typical security measures. The system 200 further includes an industrial system representation 206 that represents devices, process cells, areas, etc. that are existent in relation to the factory floor 202. For instance, the system representation 206 can include a hierarchical representation of a plant and/or the factory floor 202. Further, the system representation 206 can include representations of procedures/processes that are undertaken within the factory floor 202. For example, a procedure as well as sub-procedure employed to manufacture an ingestible product can be represented within the system representation 206.

The system representation 206 receives a security request related to one or more devices, process cells, areas, sites, etc. For example, through a human-machine interface (HMI) or other suitable graphical user interface an operator can generate a security request related to a particular zone 208 within the factory floor 202. Specifically, an operator can request disablement/modification of particular security procedures/devices related to the zone 208. Thus, an operator could view a graphical representation of a procedure implemented on the factory floor 202 within the system representation 206, and deliver a security-related request associated with the procedure to the system representation 206. The security request can thereafter be delivered to the security system 204, which can determine whether the operator initiating the security request is authorized to effectuate security procedures relating to the request. This can be accomplished by an authentication component 210, which can make authorization determinations based on indicia such as user name, password, user role, plant location, time of day, day of a week, device(s) effected by the request, procedures effected by the request or any other suitable security-related factors. Further, the security system 204 can employ a security server (not shown) or the like to store and effectuate authentication algorithms and related data. In accordance with one aspect of the present invention, biometric attributes, such as fingerprints, retina scans, voice recognition techniques, and the like can be employed in connection with authenticating an operator. Thus, the authentication component 210 provides an additional layer of security by enabling only those with authorization to modify policies/procedures of the security system 204 as it relates to the factory floor 202.

If the operator/user is authorized to modify existent security procedures with respect to a device, set of devices, process cells, areas, sites, etc., the request is passed to a zonal security component 212. The zonal security component 212 can then generate security procedures for the zone 208, where the zone 208 relates to the initial request. Particularly, if the request related to disabling an alarm for a particular piece of equipment, the zone 208 can include device(s) that are comprised by such process. Thus, the zonal security component 212 can be employed to effectuate security procedures related to specific devices, process cells, areas, etc., rather than to the entire factory floor 202 as is required in conventional security systems.

In accordance with another aspect of the present invention, the authentication component 210 can be employed to ensure that security procedures generated by the zonal security component 212 are directed to appropriate device(s) within the zone 208. For instance, the zonal security component 212 can desirably disable alarms relating to a device employed in connection with a mixing operation for a pharmaceutical. The authentication component 210 can thereafter be employed to ensure that the device actually being delivered commands for disabling an alarm is the device that is desirably being delivered the commands. If a disparate device were to receive alarm disable commands or other security-related instructions, catastrophic results could occur (e.g., a pharmaceutical could be incorrectly manufactured due to lack of an alarm). Thus, the authentication component 210 supports variable levels of device authentication. For instance, the authentication can utilize, but is not limited to, digital signatures and certificates, where keys and encryption can range from simple to complex in a single industrial automation enterprise. It is to be understood that while the authentication component 210 has been described in connection with authenticating both operators and devices on the factory floor 202, separate components could be employed for such authentication purposes.

Figure 3:
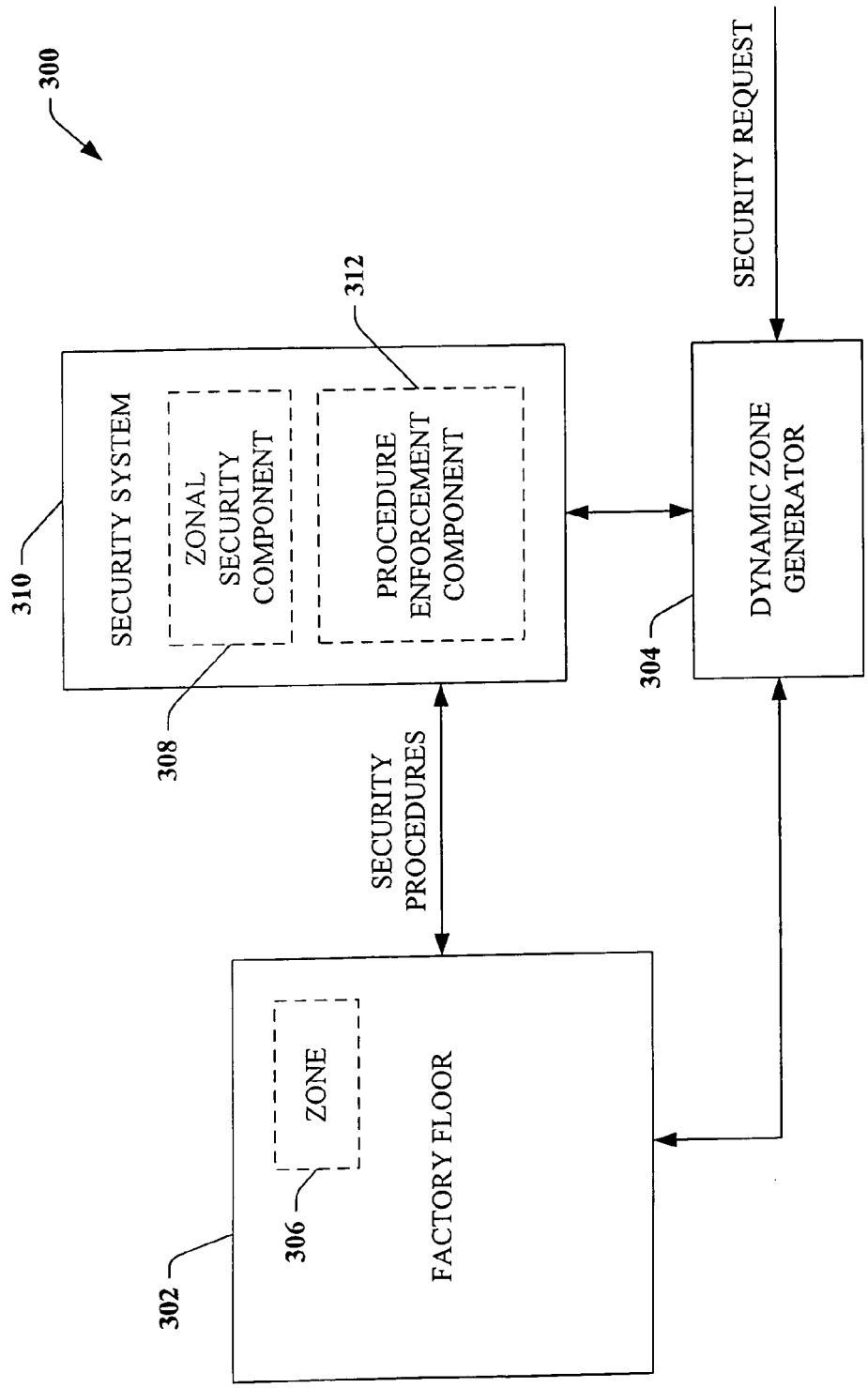
FIG. 3 is a block diagram of a system that facilitates generating and implementing zonal security procedures within a factory floor in accordance with an aspect of the subject invention.

Turning now to FIG. 3, a system 300 that facilitates providing security procedures to a portion of a factory floor 302 is illustrated. The factory floor 302 includes a plurality of devices that are employed for manufacturing purposes. A dynamic zone generator 304 receives a request to modify security relating to a portion of the factory floor 302. For example, the security modification request can relate to testing, debugging, maintaining, and the like of a particular devices, process cells, areas, sites, etc. Based upon the request, the dynamic zone generator 304 can query the factory floor 302 or a representation thereof to determine a current configuration of such factory floor 302. Based upon the determined configuration, the dynamic zone generator 304 can create a zone 306 for which security modifications are to be made. A particular example may assist in clarifying operation of the dynamic zone generator 304. An operator requests that an alarm be disabled for a particular device to perform maintenance on such device. The dynamic zone generator 304 receives the request, and determines a configuration of the factory floor 302 with respect to the device. Particularly, the dynamic zone generator 304 obtains information relating to operations involving the device, interconnected devices, related devices, etc. For example, halting operation of the device and disabling the alarm may cause a different alarm associated with a disparate device to trigger. Thus, other associated alarms should also be disabled. The dynamic zone generator 304 can determine which alarms should be disabled based upon a current configuration of the device specifically, and the factory floor 302 in general.

Upon dynamically creating the zone 306, the security request and the associated zonal information can be received by a zonal security component 308 within a security system 310 that is utilized to provide security with respect to the factory floor 302. The zonal security component 308 can thereafter provide security procedures for the zone 306. For instance, the security procedures can include disabling an alarm for maintenance, and thereafter resetting safety switches upon completion of the maintenance. A procedure enforcement component 312 ensures that all appropriate security procedures have been complied with prior to re-initializing devices/operations within the zone 306. For instance, if the security procedures generated by the zonal security component 308 are not complied with, the procedure enforcement component 312 will prohibit the zone 306 from being placed back in normal operation. The procedure enforcement component 312 can be associated with alarms, a graphical user interface to remind an operator of required procedures, and other suitable enforcement mechanisms.

Figure 4:
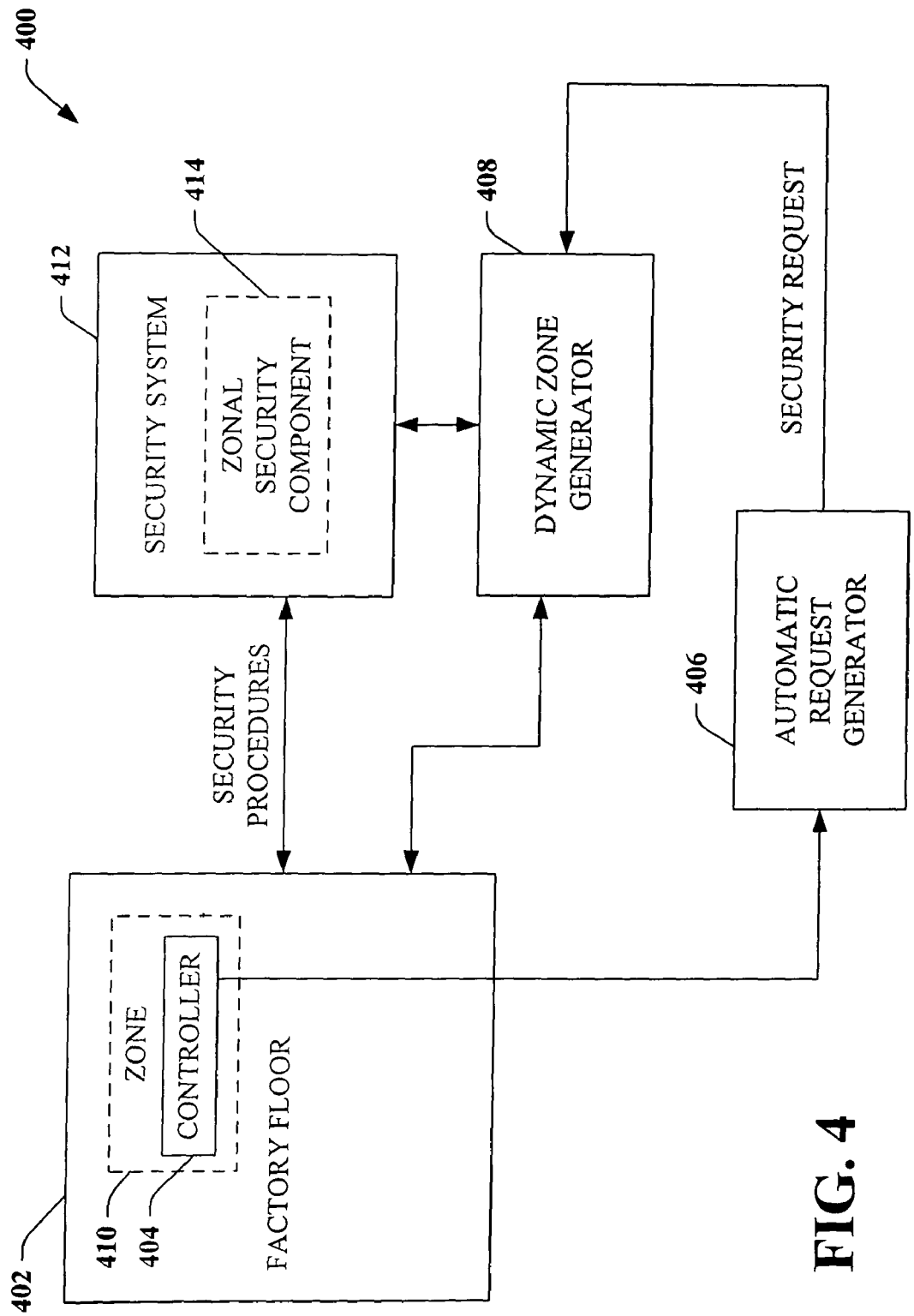
FIG. 4 is block diagram of a system that facilitates generating and implementing zonal security procedures within a factory floor in accordance with an aspect of the subject invention.

Now referring to FIG. 4, a system 400 that facilitates implementation of security procedures for a portion of a factory floor 402 is illustrated. The factory floor 402 includes an industrial controller 404 that can monitor the status of sensors and actuators and be utilized in connection with controlling a manufacturing process undertaken within the factory floor 402. Based upon this collection of data, the controller 404 can generate an alarm or similar indicia that can be transformed into a security request by an automatic request generator 406. For instance, if the controller 404 provides an alarm, the automatic request generator 406 can create a request to disable the alarm relating to that controller 404.

The security request can then be delivered to a dynamic zone generator 408, which can determine a zone 410 within the factory floor 402 in which security procedures will apply. For instance, the dynamic zone generator 408 can query the factory floor 402 and determine a configuration of the controller 404 (e.g., devices and/or operations controlled by the controller 404). Based upon such determination, the dynamic zone generator 408 can create the zone 410 that encompasses such controller 404, wherein the zone 410 may include other controllers, devices, etc. In accordance with a disparate aspect of the present invention, the factory floor 402 can previously be partitioned into a plurality of zones. Thus, the dynamic zone generator 408 need only to locate the appropriate defined zone 410 that includes the controller 404. Upon determination and/or generation of the zone 410, a security system 412 that operates to secure the factory floor 402 receives the request and corresponding zone 410 and a zonal security component 414 generates security procedures relating to the zone 410. For example, the zone 410 can include a plurality of devices controlled by the controller 404 that are employed in connection with a manufacturing operation. The security procedures created by the zonal security component 414 can relate to disabling alarms, setting security switches, resetting security switches, and other suitable security-related procedures.

Figure 5:
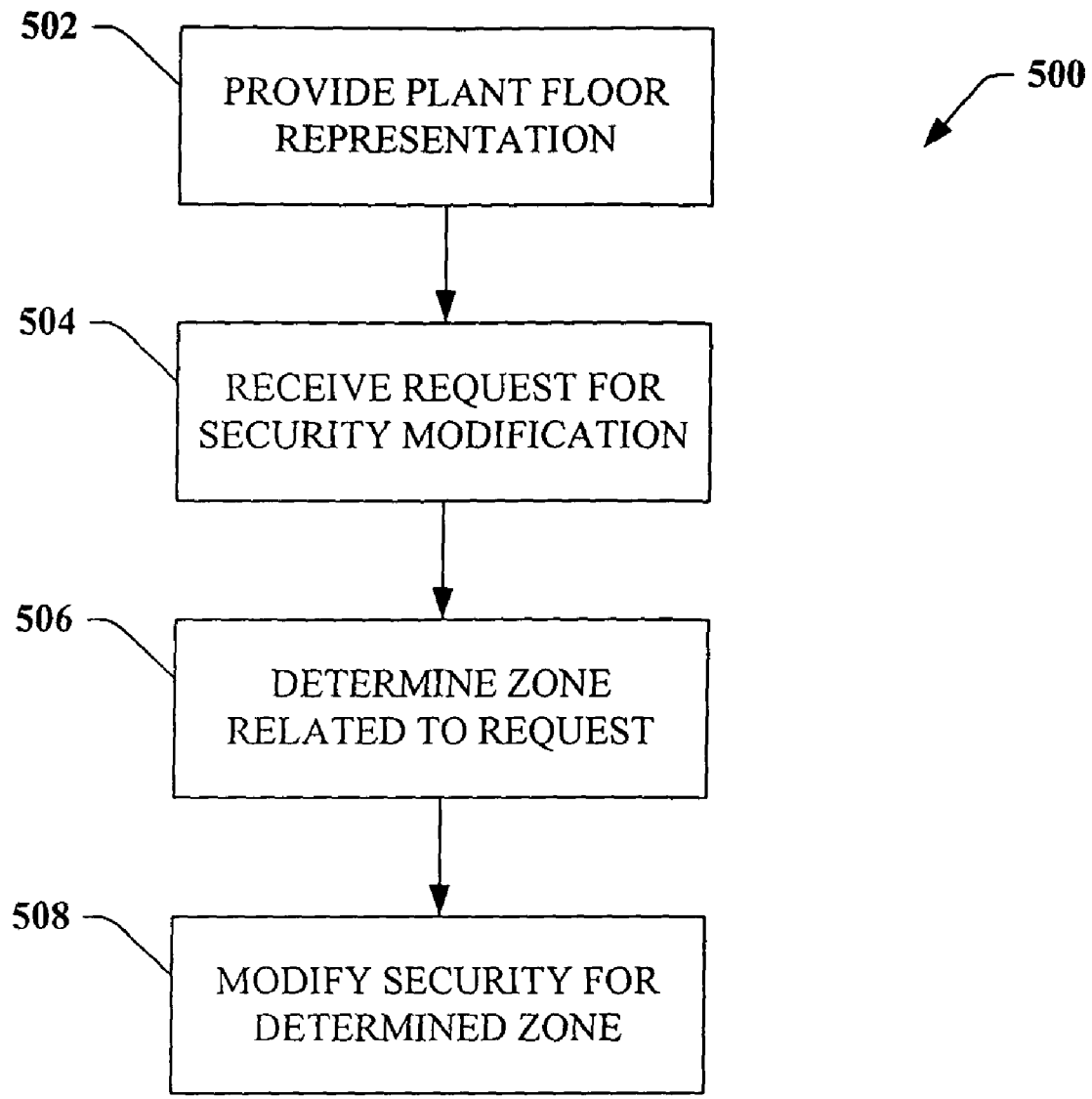
FIG. 5 is a representative flow diagram illustrating a methodology for modifying security relating to a zone within a factory floor in accordance with an aspect of the subject invention.

Turning now to FIG. 5, a methodology 500 for implementing security procedures within only a portion of a factory floor is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a factory floor representation is provided. For example, the factory floor representation can be displayed on a graphical user interface or HMI to enable a user to visualize such representation. Further, an SP95 standard and/or an S88 standard can be employed in connection with the factory floor representation. Therefore, a hierarchical representation of the factory floor can be rendered, wherein the hierarchy is logically created according to plant floor application. Further, data models can be employed to represent batch processing applications (e.g., a description of a recipe). Utilized in combination, a complete representation of a factory floor can be created. For instance, devices can be associated with disparate devices in the factory floor representation, and such devices can be represented to operate conjunctively to complete a manufacturing application. While these aforementioned standards can be employed in connection with generating the system representation, it is understood that any suitable data models can be employed in connection with providing a factory floor representation.

At 504, a request for a security modification is received. The request can be generated by a device equipment operator and/or automatically generated by one or more intelligent factory floor devices (e.g., an industrial controller). For instance, a timer can be employed to determine when a device is scheduled for maintenance. Upon sensing that a device is due for maintenance, an industrial controller or other intelligent factory floor device can generate a request to disable alarms associated with the device for maintenance purposes. An operator can request that alarms be disabled for a particular device or set of devices when testing or debugging logics within an industrial controller. For instance, the operator may wish to test a control program for a sub-process without compromising security of a recipe for a parent process. Accordingly, the operator can generate a request for such modification.

At 506, a zone related to the modification request is determined. For example, an operator can specify precisely which device(s), operation(s), applications, etc. should make up a zone relating to the request. In accordance with another aspect of the present invention, the factory floor modification can include defined zones, wherein one or more of the defined zones can be selected as the zone(s) related to the request. Such zone selection can be completed automatically or specified by an operator. Further, the zone can be dynamically determined based upon configuration of the factory floor and the request. For instance, an operator can request a particular security modification with respect to an industrial controller, wherein implementation of such request with respect to the industrial controller would cause other related devices to operate abnormally. Accordingly, security procedures with respect to those devices also should be modified. Therefore, based upon the request and the factory floor configuration, an appropriate zone can be automatically determined.

At 508, security for the determined zone is modified. For instance, security procedures specific to the determined zone can be generated and implemented upon determination of such zone. This enables a particular device, set of devices, procedure, application, etc. to be tested, debugged, maintained, diagnosed, re-commissioned, and the like without comprising security of the entire factory floor. Such zonal security enables a particular operation or device to be extracted from the security system without affecting security of other devices or operations.

Figure 6:
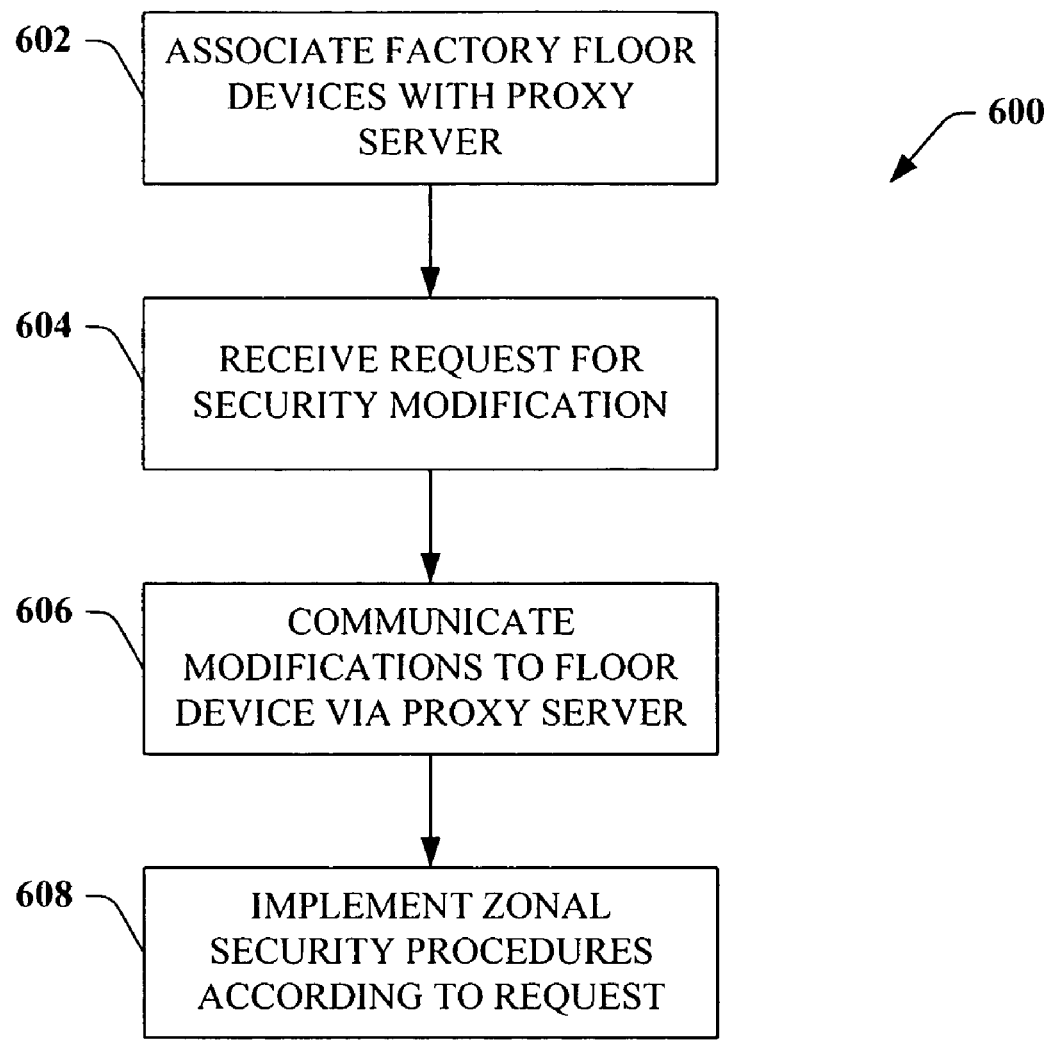
FIG. 6 is a representative flow diagram illustrating a methodology for modifying security relating to one or more factory floor devices via a proxy server in accordance with an aspect of the subject invention.

Now turning to FIG. 6, a methodology 600 for providing zonal security procedures to plant floor devices that lack substantial intelligence is illustrated. At 602, one or more factory floor devices are associated with a proxy server. Factory floor devices can desirably be associated with a proxy server, as several of such devices lack substantial intelligence and/or processing power. Rather, such devices are typically optimized for a single operation, and typically do not require substantial intelligence and/or processing power. Accordingly, there exists insufficient processing capabilities and/or storage capabilities with respect to the factory floor devices to store and operate security primitives. In accordance with an aspect of the present invention, such devices, however, can be accessed and communicate through a proxy server. Thus, in order for an operator and/or component to access or utilize such devices, the proxy server must be employed (e.g., all communications channel through the proxy server). Therefore, a plurality of devices can be aggregated through utilization of a proxy server, which can thereafter administer security to such factory floor devices.

At 604, a request for a security modification is received with respect to a factory floor device that lacks sufficient intelligence. For instance, a particular industrial controller may not be associated with a substantial amount of processing capabilities and/or memory, thus rendering it impractical/impossible to store and implement security primitives therein. However, for example, it may be desirable to disable alarms associated with such industrial controller to effectuate maintenance of a device controlled by the industrial controller. Therefore, at 606, requested security modifications are communicated to one or more factory floor devices via the aforementioned proxy server. The proxy server is associated with sufficient memory and/or processing capabilities to store and implement security privileges, and thereafter communicates/implements zonal security procedures to one or more devices. At 608, the zonal security procedures are implemented according to the request. For instance, the zonal security procedures can be applied to all devices that communicate through the proxy server. In accordance with a disparate aspect of the present invention, the proxy server can be employed to selectively implement security procedures on one or more devices that communicate via the proxy server.

Figure 7:
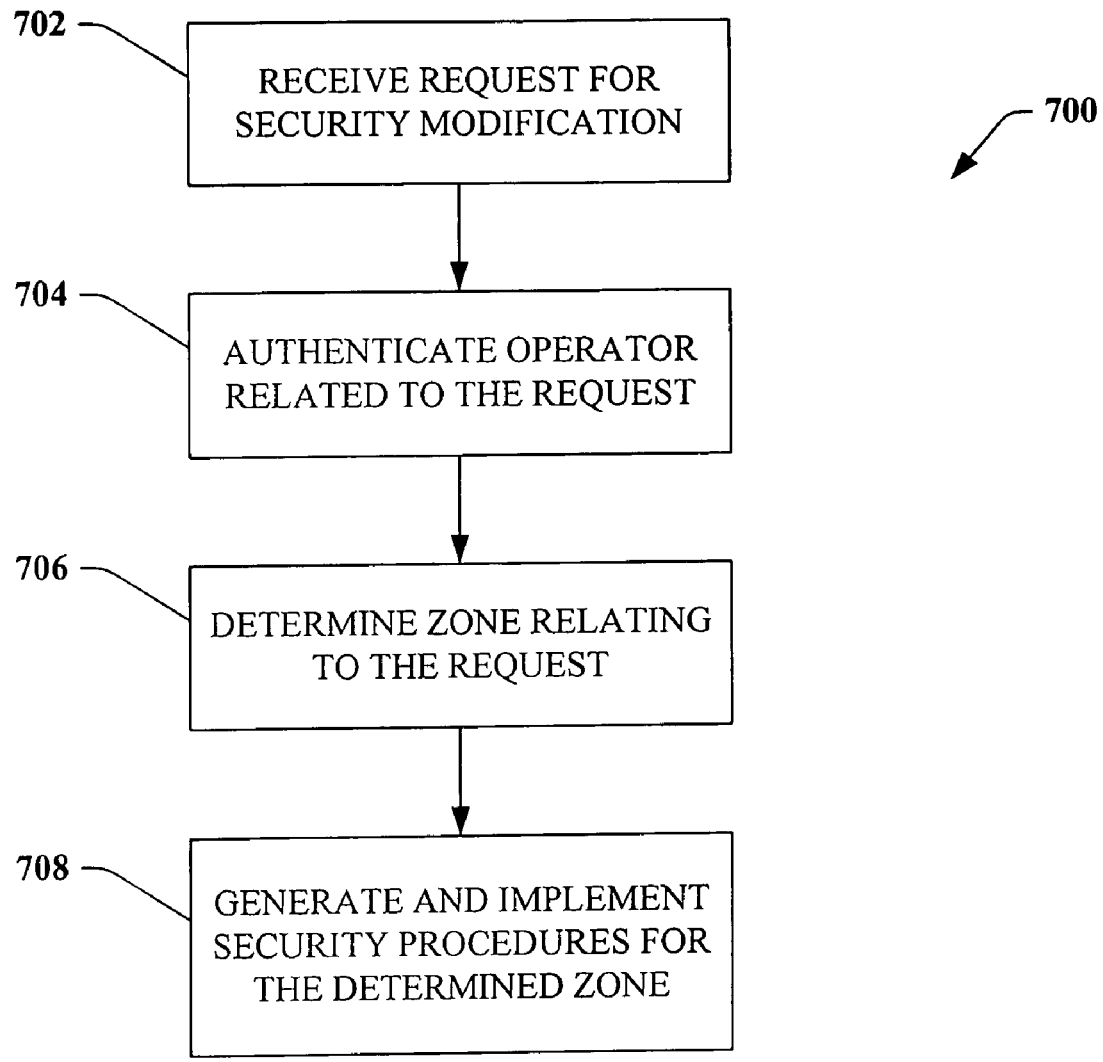
FIG. 7 is a representative flow diagram illustrating a methodology for authenticating an operator prior to implementing zonal security procedures in accordance with an aspect of the subject invention.

Now referring to FIG. 7, a methodology 700 for generating and implementing zonal security procedures is illustrated. At 702, a request for security modification relating to a particular device, applications, procedure, group of devices, etc. is illustrated. For instance, control logic relating to an operation may desirably be tested; therefore, security relating to an industrial controller that utilizes such control logic must be relaxed to enable an operator to effectively test such control logic. In accordance with one aspect of the present invention, the request is initiated or authorized by an operator. At 704, the operator that is related to the request is authenticated. For example, conventional authentication techniques can be employed, such as user names and passwords. Furthermore, artificial intelligence techniques can be employed in connection with authenticating a user.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, based upon contextual data relating to an operator, it can be determined whether such operator is authorized to access and/or modify security with respect to a particular zone. Thus, a particular operator may only be authorized to modify particular devices given specific times, device procedures, operator location, etc. Thus, utilizing contextual data relating to a factory floor, zone, and/or operator can make various authorization inferences.

At 706, a zone is determined relating to the request received at 702. The zone can be dynamically determined by an intelligent component, or pre-defined according to known areas, procedures, devices, sites, process cells, etc. At 708, as described above, security procedures are generated and implemented for the determined zone. In accordance with one aspect of the present invention, common data models that can be generated and understood both by factory floor devices (e.g., industrial controllers) and high-level systems (e.g., ERP systems and MES systems) can be employed to facilitate generation and implementation of zonal security procedures.

Figure 8:
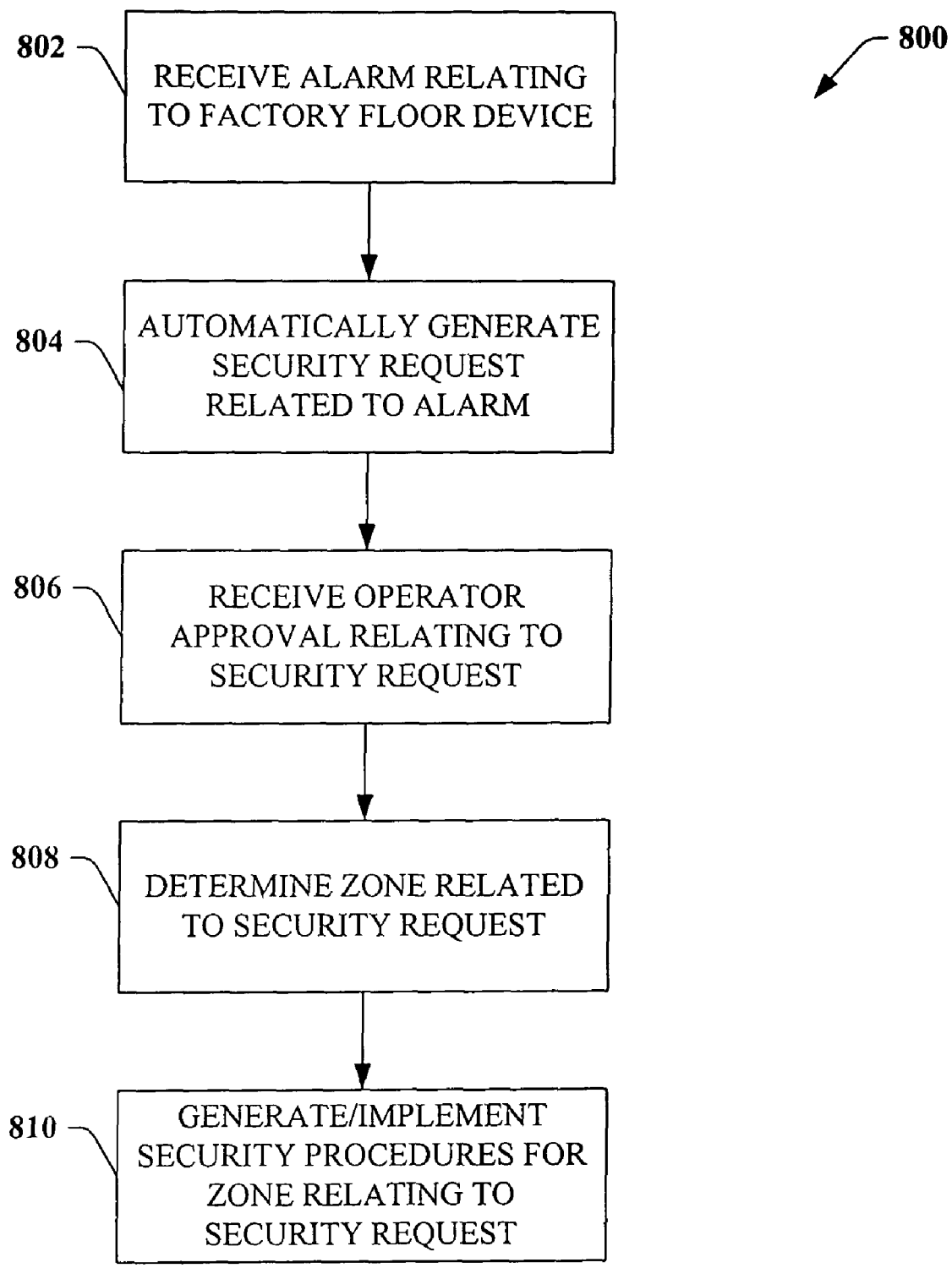
FIG. 8 is a representative flow diagram illustrating a methodology for automatically generating zonal security procedures based upon an alarm on a factory floor in accordance with an aspect of the subject invention.

Now referring to FIG. 8, a methodology 800 for automatically generating a security modification request and implementing zonal security procedures based upon such request is illustrated. At 802, an alarm relating to a factory device is received. For instance, a device, such as a press, pump, saw, etc. can fail, thereby causing an industrial controller to generate an alarm. Further, one or more sensor(s) can sense that a manufactured product has an incorrect composition, thereby causing generation of an alarm. The above are simply specific examples of generation of an alarm, and it is understood that any suitable alarm can be received in connection with the methodology 800. At 804, a security request is automatically generated upon receipt of the alarm. For instance, if an alarm relates to a particular device, a request to modify security relating to that device can be automatically generated.

At 806, operator approval relating to the security request is received. Such operator approval mitigates occurrences of false alarms. For example, an alarm can be generated based upon a faulty sensor. Therefore, it would be inefficient to disable security relating to an operation based upon the faulty sensor. Allowing an operator to approve the security request prior to modifying security enables determination of sensor failure prior to modifying security. At 808, upon operator approval a zone relating to the security request is determined. Thus, if the alarm originated from a device, a zone that includes that device can be determined. Moreover, an operation that utilizes the device can be considered a zone. At 810, security procedures for the determined zone are generated and implemented within the zone.

Figure 9:
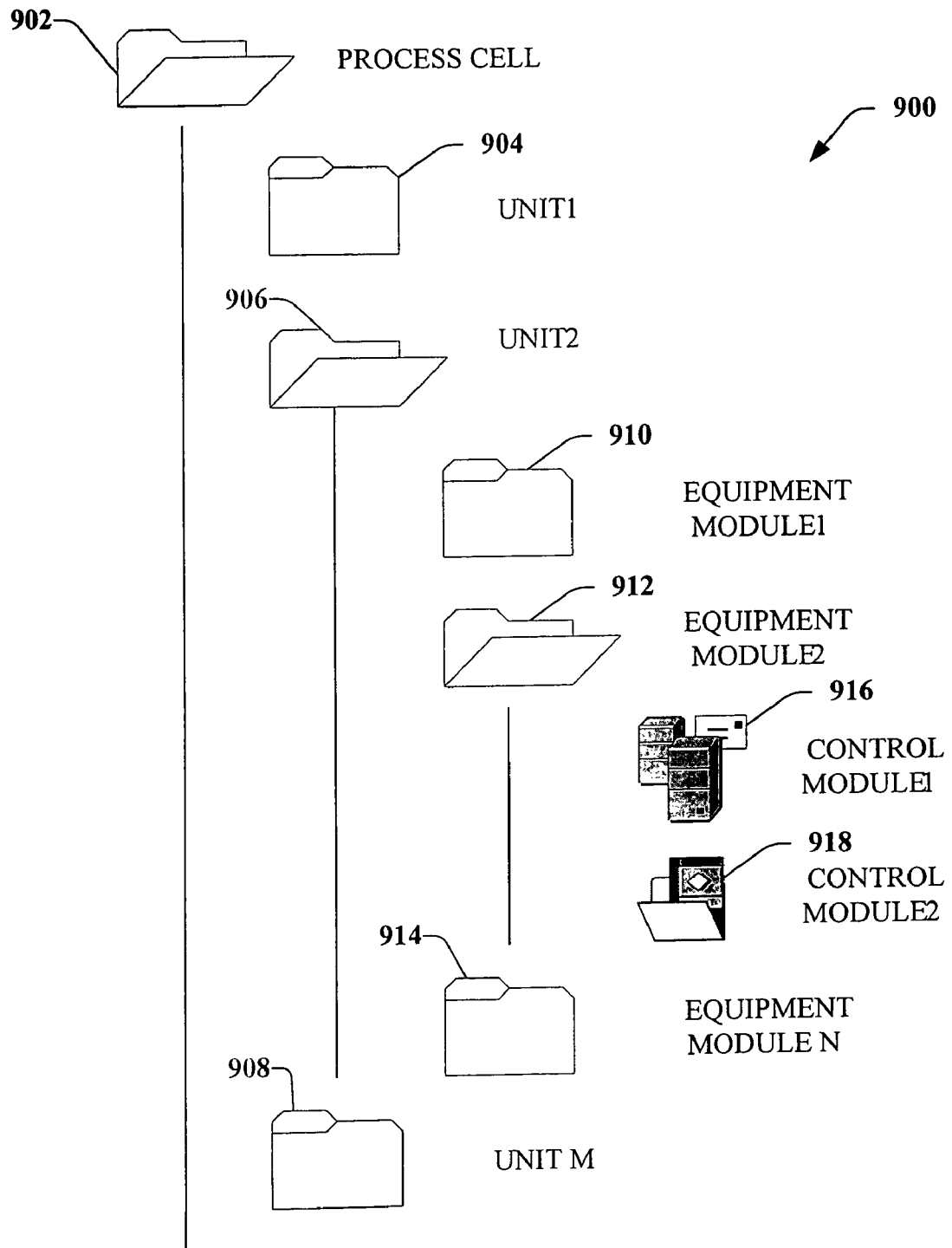
FIG. 9 is an exemplary system representation that can be employed in connection with the subject invention.

Now turning to FIG. 9, an exemplary factory floor representation 900 that can be employed in connection with the present invention is illustrated. The representation 900 is a hierarchical representation of a particular factory floor. At the highest level of the hierarchy is a folder 902 or graphical representation of a process cell. A process cell is a logical grouping of equipment that includes equipment utilized in connection with one or more batch operations. While the process cell is shown as being at an upper portion of a hierarchy, it is to be understood that the process cell can be included in a representation within an enterprise, site, area, or the like. In accordance with the exemplary representation 900, the process cell folder 902 can be expanded to show particular units within such plant process. Particularly, the plant includes a folder 904 that represents a first unit, a folder 906 that represents a second unit, and a folder 908 that represents an Mth unit, where M is an integer. A unit can be defined as a collection of control modules and/or equipment modules and other equipment in which one or more processing activities can be conducted.

Folder 906 is shown as expanded, and includes a folder 910 that represents a first equipment module, a folder 912 that represents a second equipment module, and a folder 914 that represents an Nth equipment module, where N is an integer. An equipment module can be a functional group of equipment that can carry out a finite number of particular activities. Folder 912 is expanded, and is illustrated to include representations 916 and 918 of control module 1 and control module 2, respectively. While the process cell, units 1-M, and equipment modules 1-N are shown to be represented by folders, it is understood that any suitable hierarchical representation can be employed in connection with the subject invention. Further, while not specifically shown, the representation 900 can include representations of particular operation steps, recipes, and other batch manufacturing information and can be generated by employing SP95 standards and S88 standards.

In accordance with the subject invention, any one of the folders 902-914 can be selected as zones for implementing zonal security modifications. For instance, if an operator wanted to modify security relating to an entire process cell, such operator could select folder 902 in connection with generating and implementing such modifications with respect to the process cell. Similarly, if an operator desired to create zonal modifications with respect to a particular unit, equipment module, or control module, the operator can select corresponding representations within the factory floor representation 900 to effectuate such zonal procedural modifications.

Figure 10:
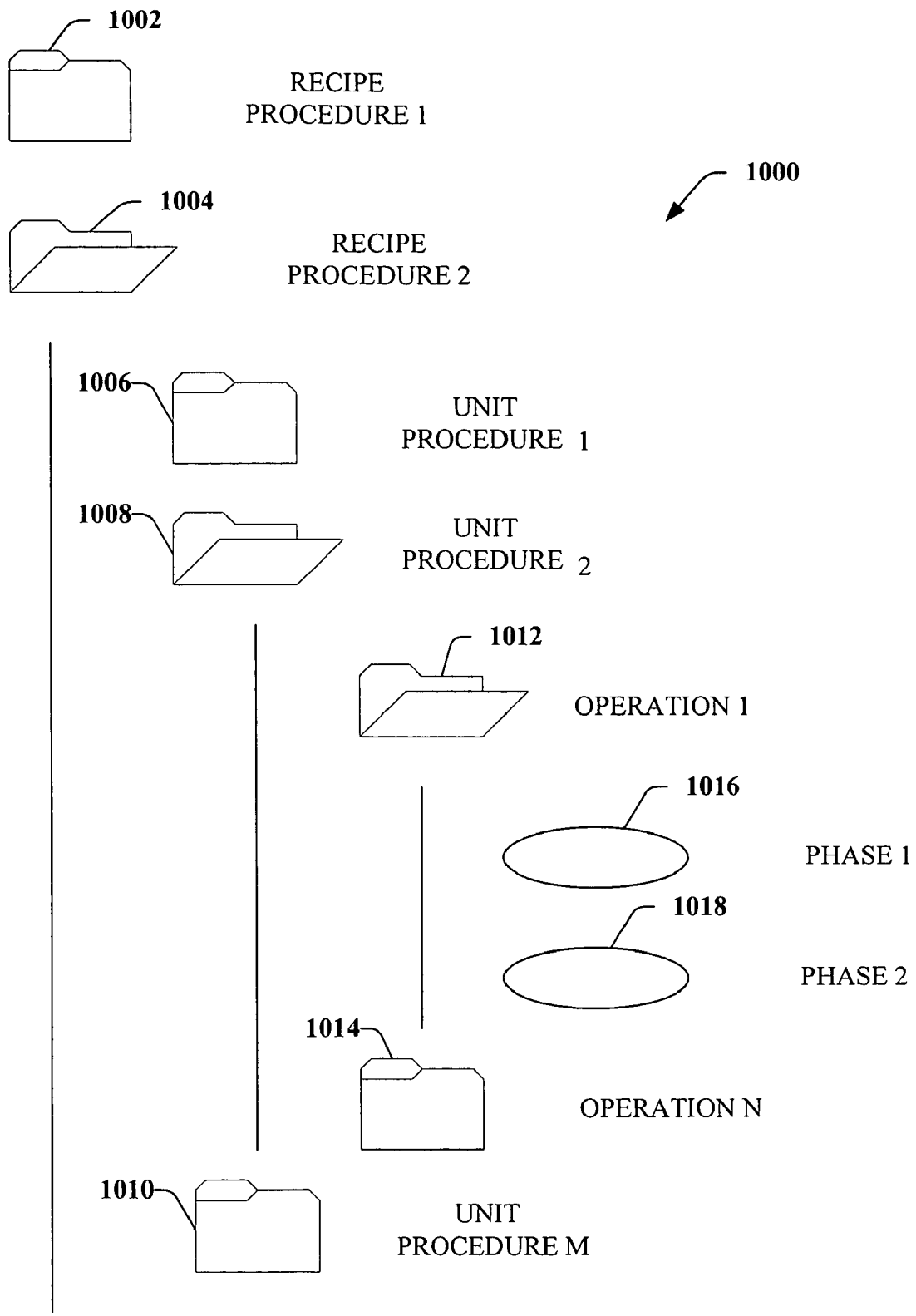
FIG. 10 is an exemplary hierarchical representation of applications/operations within an automation environment that can be employed in connection with the subject invention.

Turning now to FIG. 10, another exemplary hierarchical representation 1000 of applications/operations within an automation environment is illustrated. The representation 1000 includes folders 1002 and 1004 that represent a first recipe procedure and a second recipe procedure, respectively. Recipe procedures are an entirety of a recipe for a batch product. Thus, multiple recipe procedures can be utilized on a factory floor. The folder 1004 is expanded to illustrate folders 1006-1010, which represent a first unit procedure, a second unit procedure, and an Mth unit procedure, where M is an integer. Unit procedures can be defined as a set of procedures that are carried out with respect to a particular unit. Thus, one recipe procedure can be associated with multiple unit procedures. The folder 1008 is expanded to show folders 1012 and 1014, which represent a first operation and an Nth operation, where N is an integer. Operations can be defined as independent processing activities consisting of algorithm(s) utilized for initiation, organization, and control of phases. The folder 1012 is expanded and includes a representation of a first phase 1016 and a second phase 1018, wherein phases are a lowest level of procedural elements utilized with executing an equipment module (FIG. 9) in the hierarchical representation 1000. Like the hierarchical representation 900 of FIG. 9, any suitable folder and/or representation can be selected as a security zone in connection with the subject invention. For example, the second unit procedure (including operations 1-M and all included phases) can be selected as a security zone. Similarly, phase 1 can be selected as a security zone.

Figure 11:
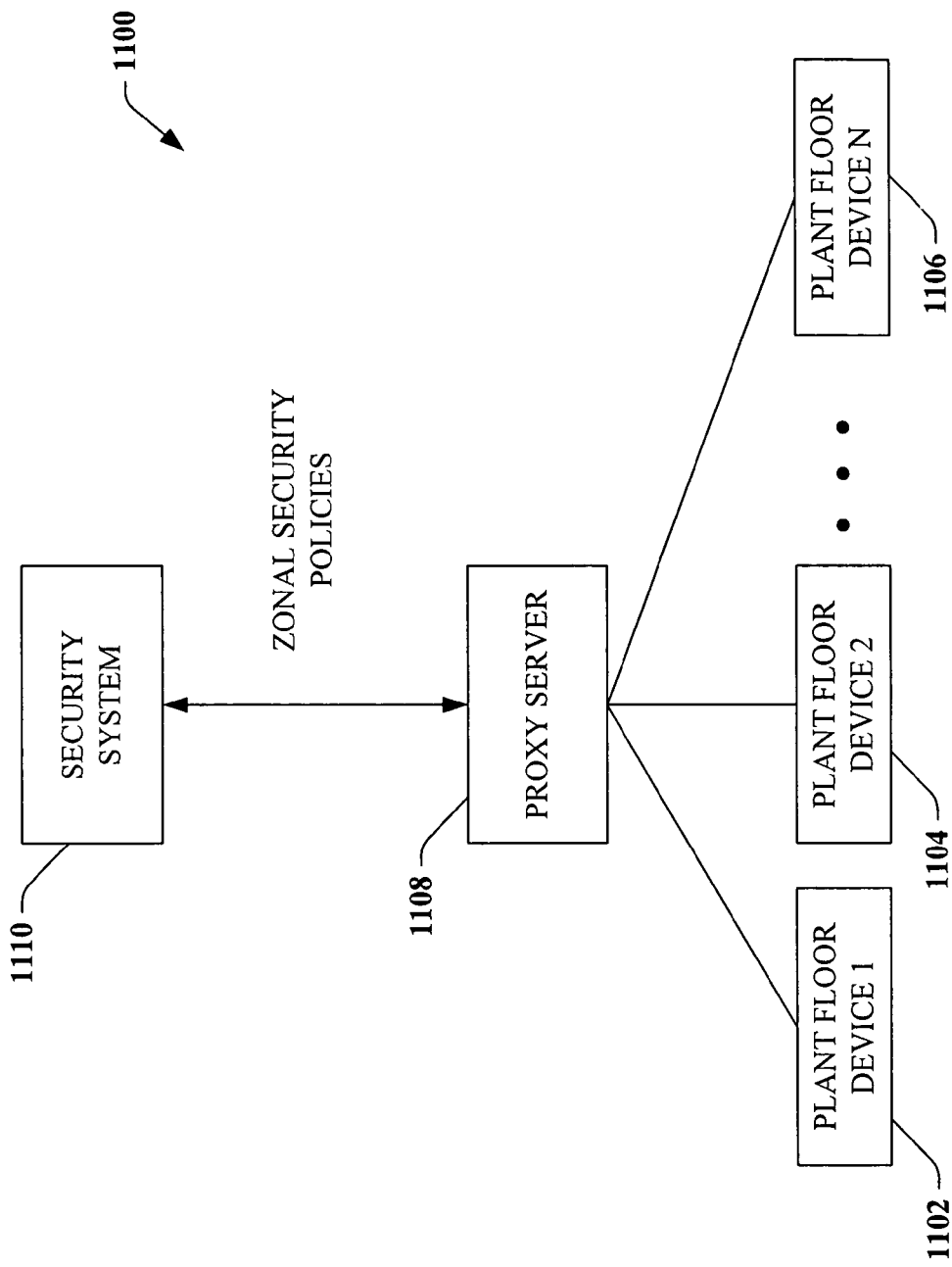
FIG. 11 is block diagram of a system that facilitates applying security procedures to factory floor devices via a proxy server in accordance with an aspect of the subject invention.

Now referring to FIG. 11, a system 1100 that facilitates providing zonal security policies to devices with little intelligence is illustrated. The system 1100 includes a first plant floor device 1102, a second plant floor device 1104, through an Nth plant floor device 1106, where N is an integer. The plant floor devices 1102-1106 communicate with each other and receive security commands from disparate security components/systems via a proxy server 1108. Control commands from automation controllers (e.g., programmable logic controllers) and delivered to actuators and other factory floor devices are not required to pass through the proxy server 1108, as such requirement could effect performance of the automation system. For instance, if the first plant floor device 1102 desirably delivers a communication to the second plant floor device 1104, it would not deliver such communication directly. Rather, the first factory floor device 1102 delivers the communication to the proxy server 1108, which thereafter directs the communication to the second factory floor device 1104. Similarly, if a high-level system desires to communicate with one of the plant floor devices 1102-1106, it does so through the proxy server 1108. They system 1100 further includes a security system 1110 that can implement zonal security procedures with respect to a factory floor. The plant floor devices 1102-1106, however, do not include sufficient intelligence to store and implement security privileges. Therefore, the security system 1110 delivers security procedures relating to the plant floor devices 1102-1106 via the proxy server 1108. In accordance with one aspect of the present invention, the plant floor devices 1102-1106 are aggregated into a zone. Thus, security procedures implemented with respect to the first plant floor device 1102 are also implemented with respect to the second plant floor device 1104. Such may be the case when the factory floor devices 1102-1106 include very little intelligence. Alternatively, the proxy server 1108 can separately deliver zonal security procedures to the plant floor devices 1102-1106 separately.

Figure 12:
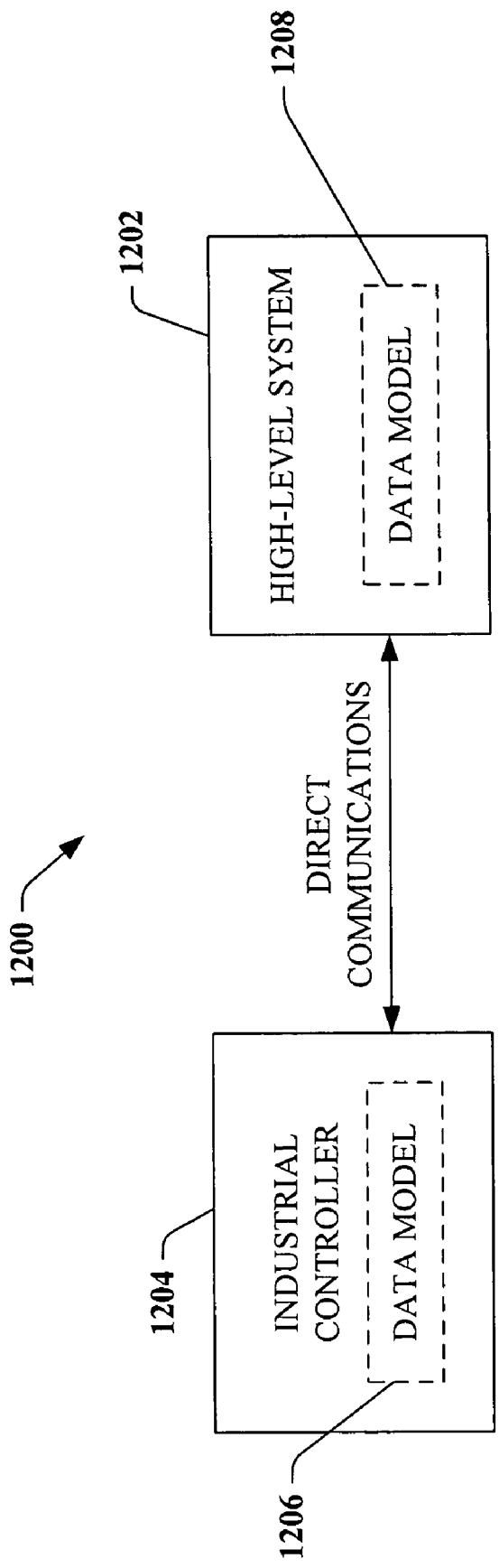
FIG. 12 is a block diagram of a system that facilitates direct communication between an industrial controller and a high-level system in accordance with an aspect of the present invention.

Turning now to FIG. 12, an exemplary communication 1200 between a high-level system 1202 and an industrial controller 1204 is illustrated. For example, the high-level system can be an ERP system and/or an MES system, and the industrial controller 1204 can be a programmable logic controller (PLC). It is to be understood, however, that any suitable system above a factory floor can be employed as the high-level system 1202, and that any suitable industrial controller can be utilized as the industrial controller 1204.

The industrial controller utilizes a data model 1206 in connection with sending and receiving communications to and from the high-level system 1202. Conventional industrial controllers only monitored status of sensors and actuators, and thus only communicated in strings of unstructured bits. By utilizing the data model 1206, however, the industrial controller 1204 can communicate directly with the high-level system 1202, as the high-level system 1202 employs a data model 1208 that is substantially similar to the data model 1206 used by the industrial controller 1204. Such direct communication facilitates implementing zonal security procedures, as the high-level system 1202 can communicate security procedures directly with the industrial controller 1204. Further, utilizing a common data model enables generation of a factory floor representation that can be employed in connection with generating and implementing zonal security procedures. For instance, SP95 standards and S88 standards are two exemplary standards that can be utilized as the data models 1206 and 1208. It is to be understood, however, that any suitable structured data model can be employed in accordance with the subject invention.

Figure 13:
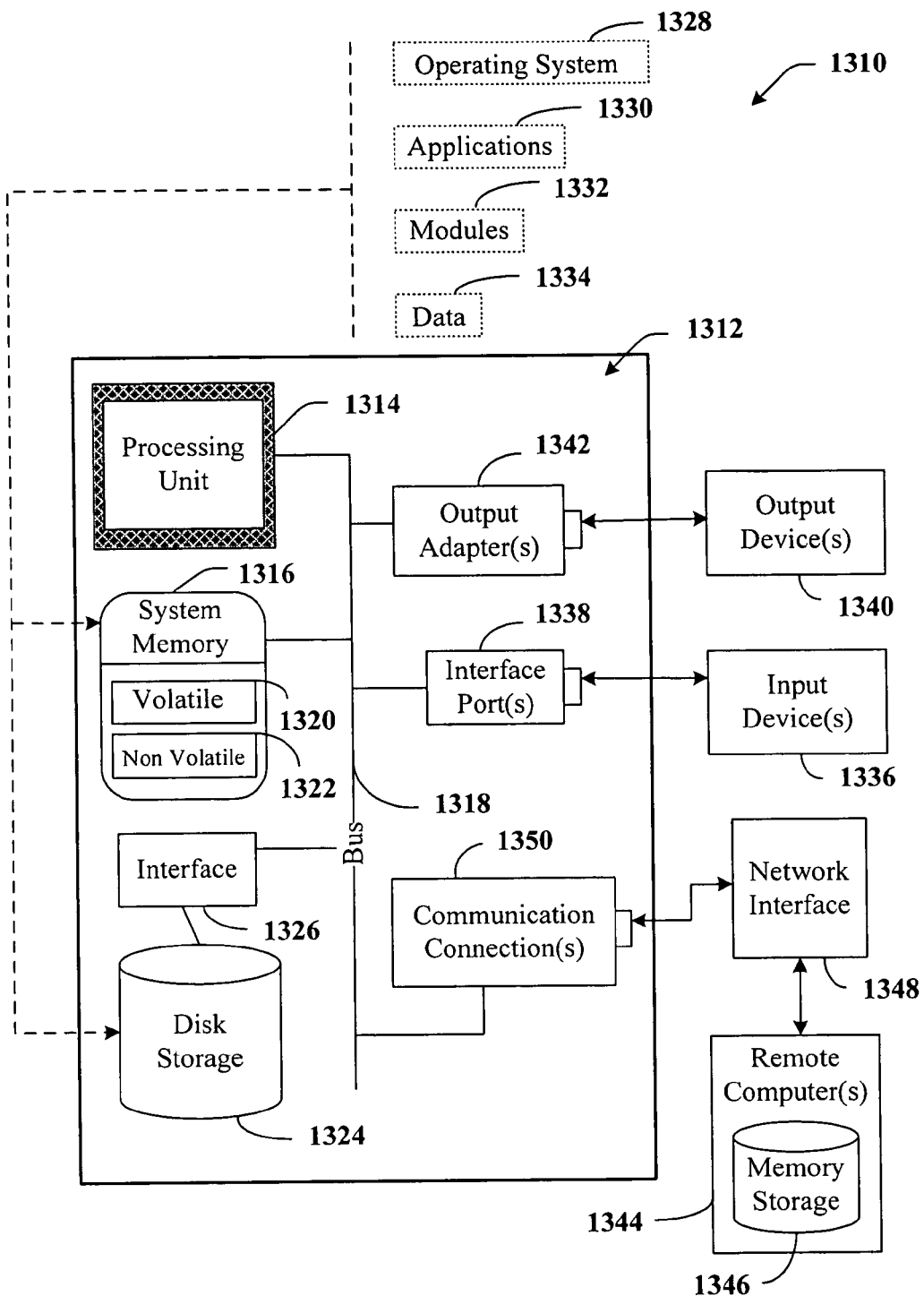
FIG. 13 is an exemplary operating environment that can be employed in connection with the subject invention.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
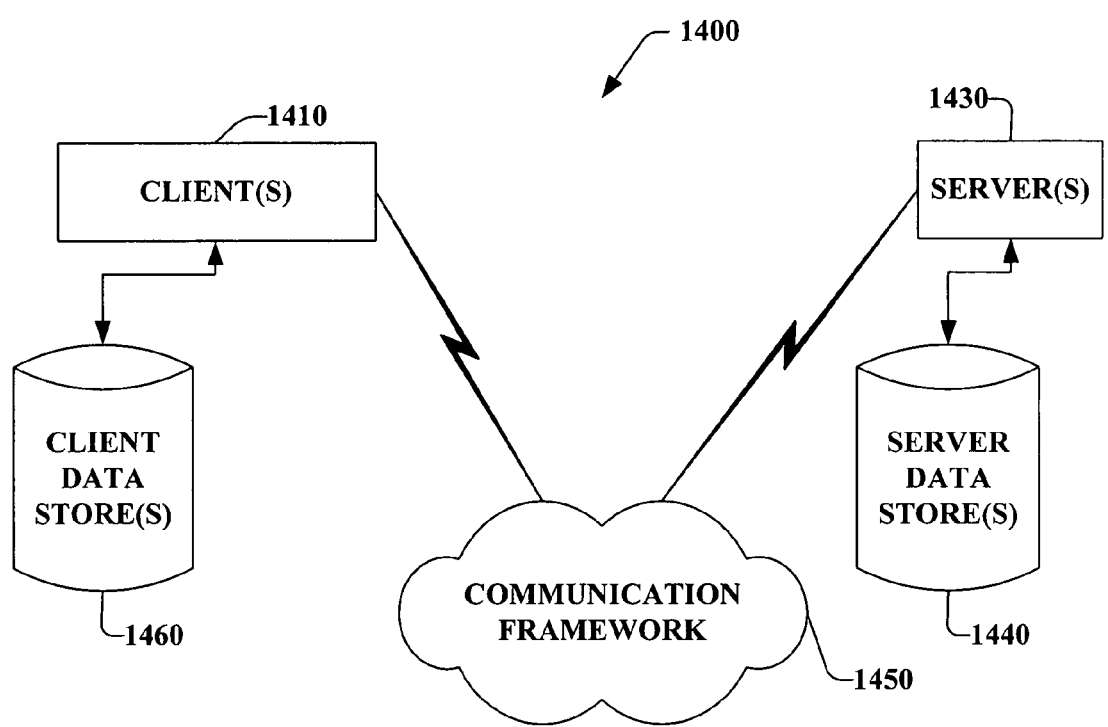
FIG. 14 is an exemplary operating environment that can be employed in connection with the subject invention.

FIG. 14 is a schematic block diagram of a sample-computing environment 1400 with which the subject invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for modifying security policy in a factory floor, the system comprising:
 a processor;
 a memory communicatively coupled to the processor, the memory having stored therein computer readable instructions that, when executed by the processor, cause the processor to perform:
 associating a factory floor security policy with a plurality of devices on the factory floor, wherein the plurality of devices and the security policy are associated with a hierarchically structured data model of the factory floor;

receiving a request to disable an alarm of a first device located on a factory floor for at least one of testing, debugging and maintenance;

verifying the request to disable the alarm based on at least one of device location, time, date, and the security policy;

determining a security zone related to the request by querying the hierarchically structured data model, wherein the security zone includes a second device located on the factory floor interacting with the first at device during a manufacturing operation based on the hierarchically structured data model;

disabling the factory floor security policy to the security zone, including disabling the alarm of the first device and disabling a second alarm associated with the second device, while applying the factory floor security policy to other areas within the factory floor; and reinstituting the factory floor security policy to the security zone upon completion the at least one of testing, debugging and maintenance.

2. The system of claim 1, wherein the request is sent in response to an alarm from the first device.

3. The system of claim 1, wherein the request is sent in response to a reaching a set time for the maintenance, test or debug of the first device.

4. A method for modifying security policy in a security zone of a factory floor, the method comprising:

employing a processor executing computer executable instructions stored on a computer readable storage medium to perform acts including:

associating a factory floor security policy with a plurality of devices on the factory floor, wherein the plurality of devices and the security policy are associated with a hierarchically structured data model of the factory floor receiving a request to disable an alarm of a first device located on a factory floor for at least one of testing, debugging and maintenance;

verifying the request to disable the alarm based on at least one of device location, time, date, and the security policy;

determining a security zone related to the request by querying the hierarchically structured data model wherein the security zone includes a second device located on the factory floor interacting with the first at device during a manufacturing operation based on the hierarchically structured data model;

disabling the factory floor security policy to the security zone, including disabling the alarm of the first device and disabling a second alarm associated with the second device, while applying the security policy to other areas within the factory floor; and reinstituting the factory floor security policy to the security zone upon completion the at least one of testing, debugging and maintenance.

5. The method of claim 4, further comprising receiving approval from an operator to disable the factory floor security policy in the security zone.

6. A non-transitory computer readable storage medium having stored thereon computer-executable instructions that, in response to execution, cause a computing system to perform operations, comprising:

associating a factory floor security policy with a plurality of devices on the factory floor, wherein the plurality of devices and the security policy are associated with a hierarchically structured data model of the factory floor receiving a request to disable an alarm of a first device located on a factory floor for at least one of testing, debugging and maintenance;

verifying the request to disable the alarm based on at least one of device location, time, date, and the security policy;

determining a security zone related to the request by querying the hierarchically structured data model wherein the security zone includes a second device located on the factory floor interacting with the first at device during a manufacturing operation based on the hierarchically structured data model;

disabling the factory floor security policy to the security zone, including disabling the alarm of the first device and disabling a second alarm associated with the second device, while applying the security policy to other areas within the factory floor; and reinstituting the factory floor security policy to the security zone upon completion the at least one of testing, debugging and maintenance.

* * * * *